Sept. 2, 1958 C. C. SANSCRAINTE 2,850,086
DENSITY CONTROLLER FOR EVAPORATORS
Filed March 9, 1950 4 Sheets-Sheet 1

INVENTOR.
Clarence C. Sanscrainte,
BY
Parker, Brochnor & Farmer,
Attorneys.

Sept. 2, 1958   C. C. SANSCRAINTE   2,850,086
DENSITY CONTROLLER FOR EVAPORATORS
Filed March 9, 1950   4 Sheets-Sheet 2

INVENTOR.
Clarence C. Sanscrainte
BY
Parker, Prichmon & Harmer,
Attorneys.

Sept. 2, 1958 C. C. SANSCRAINTE 2,850,086
DENSITY CONTROLLER FOR EVAPORATORS
Filed March 9, 1950 4 Sheets-Sheet 3
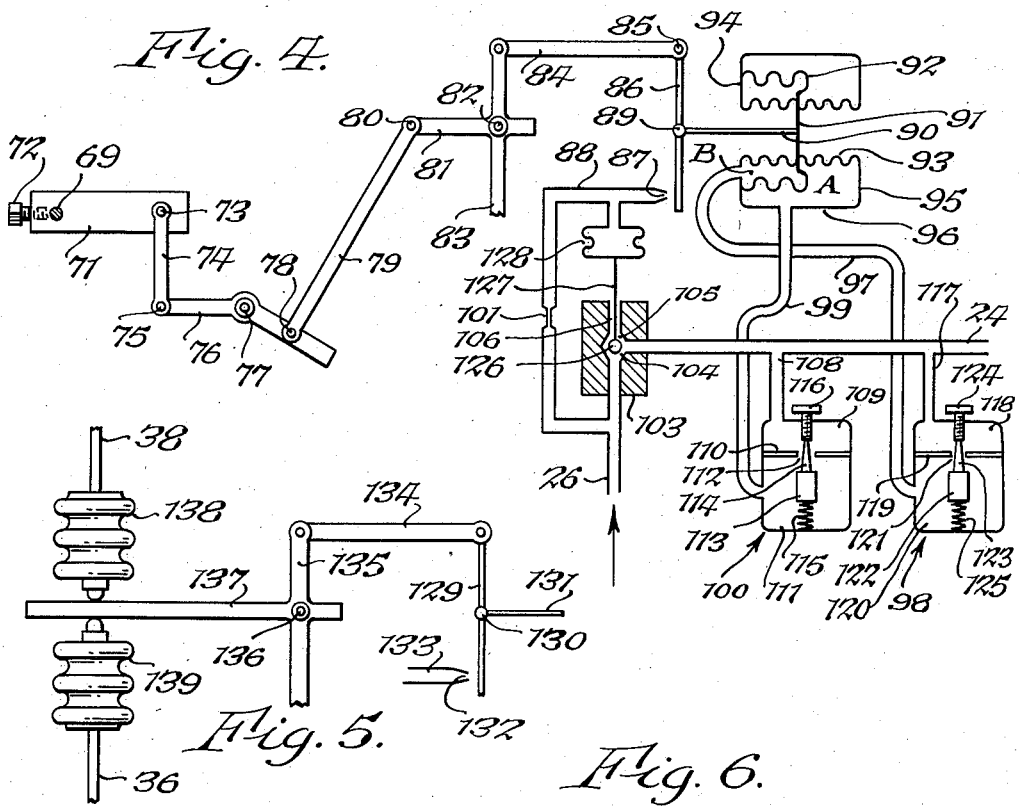
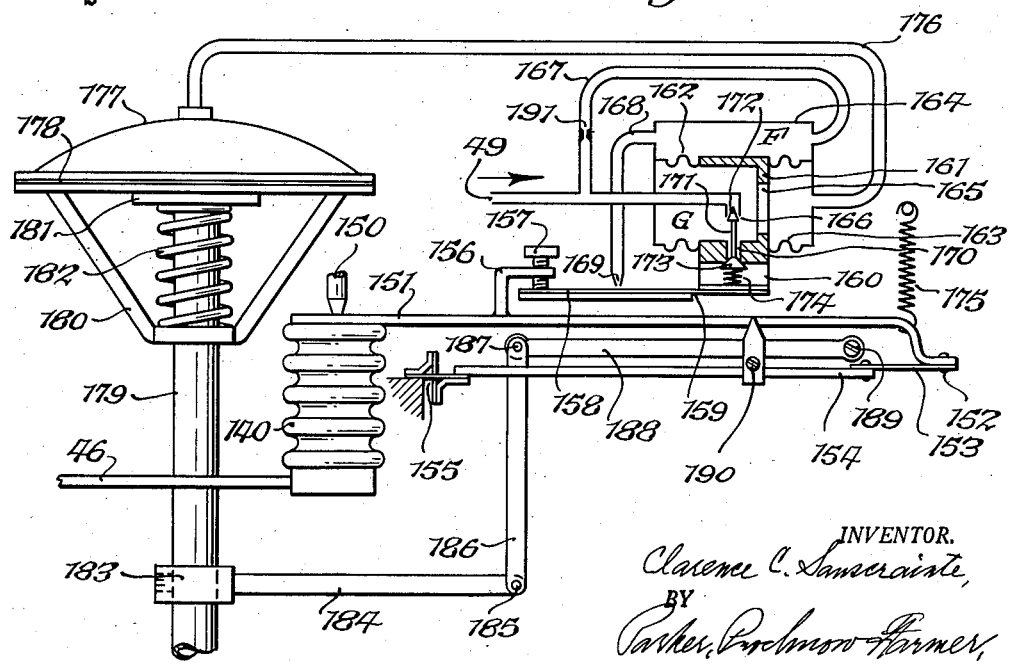
INVENTOR.
Clarence C. Sanscrainte,
BY
Parker, Erdman Harner,
Attorneys.

Sept. 2, 1958  C. C. SANSCRAINTE  2,850,086
DENSITY CONTROLLER FOR EVAPORATORS
Filed March 9, 1950  4 Sheets-Sheet 4
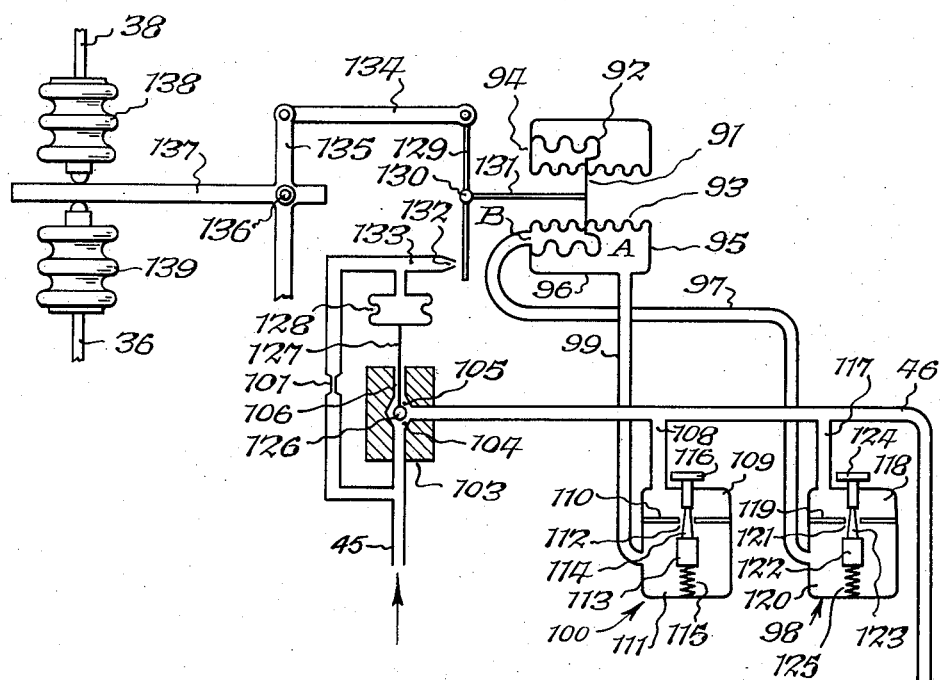
Fig. 5a.
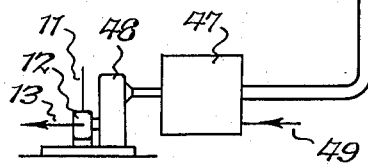
INVENTOR.
Clarence C. Sanscrainte,
BY
Parker & Trochnow,
Attorneys.

United States Patent Office 2,850,086
Patented Sept. 2, 1958

2,850,086

DENSITY CONTROLLER FOR EVAPORATORS

Clarence C. Sanscrainte, Buffalo, N. Y., assignor, by mesne assignments, to Blaw-Knox Company, Pittsburgh, Pa., a corporation of Delaware Application March 9, 1950, Serial No. 148,695

30 Claims. (Cl. 159—44)

This invention relates to density controllers by which one may provide a liquid of a predetermined density. A liquid of desired density can be prepared by evaporating a dilute liquid to the desired density, or a very concentrated liquid may be diluted with another liquid until a predetermined density is obtained, or liquids of different densities may be mixed or blended, with or without evaporation, in order to obtain a resultant liquid of desired density. A very wide use for density controllers is in connection with the concentration of liquids by evaporation of vaporizable parts until the desired degree of concentration is obtained. Concentration of fruit juices, such as grape juice and citrus fruit juices, and the concentration of tomato juices are examples of extensive commercial applications of this invention.

Heretofore, many attempts have been made to regulate the density of a liquid automatically but such prior density controllers have been unsatisfactory in that they are not sufficiently sensitive and accurate, and wide fluctuations in the density of the discharged concentrate was the usual result. It is desirable to always maintain the maximum evaporation rate of the evaporating apparatus, regardless of seasonal or occasional fluctuations in the concentration of the stock or feed liquid. The concentration of juices from natural products, such as citrus fruit juices and tomato juices, varies with seasonal, climatic and soil conditions, and with the variety of food or plant from which liquid is obtained at different times during the season. An evaporator is usually designed to use the lowest concentration of the feed liquid and the maximum steam pressure, which are permissible in view of the nature of the product to be handled. It is not desirable to change the steam pressure or the rate of evaporation in order to maintain a constant rate of discharge, since this interferes with the efficient operation of the evaporator.

An object of this invention is to provide an improved method and apparatus for controlling the density of a continuously moving liquid, with which the control may be fully automatic, sensitive, smooth and accurate and produce a liquid of a desired concentration within very close tolerances.

Another object of the invention is to provide an improved apparatus for controlling the flow of liquid through a continuous concentrator, which will automatically and accurately regulate the density of the discharged liquid within close limits, with which the control will be exceptionally sensitive and responsive, with which hunting of the controls will be substantially avoided without interfering with the smoothness of operation and without disturbing the uniformity of density in the discharged product, with which danger of contamination of the product and its oxidation by contact with air are avoided, which may be cleaned and kept in a sanitary condition so as to be useful for handling food products, which will be subject to a minimum of errors caused by viscosity, suspended solids or other properties of the liquid being handled, and which will be relatively simple, trouble-free and inexpensive.

Various other objects and advantages will be apparent from the following description of one embodiment of the invention, and the novel features will be particularly pointed out hereinafter in connection with the appended claims.

In the accompanying drawings:

Fig. 4 is a schematic diagram of part of the control mechanism shown in Fig. 3;

Fig. 5 is a diagram illustrating part of the mechanism shown in Fig. 1;

Fig. 5a is a diagram illustrating how the mechanism shown in Fig. 5 is connected to the control mechanism in the level regulator; and Fig. 6 is a schematic diagram and partial elevation of another part of the control apparatus shown in Fig. 1, and which may be called a precisor.

Figure 1:
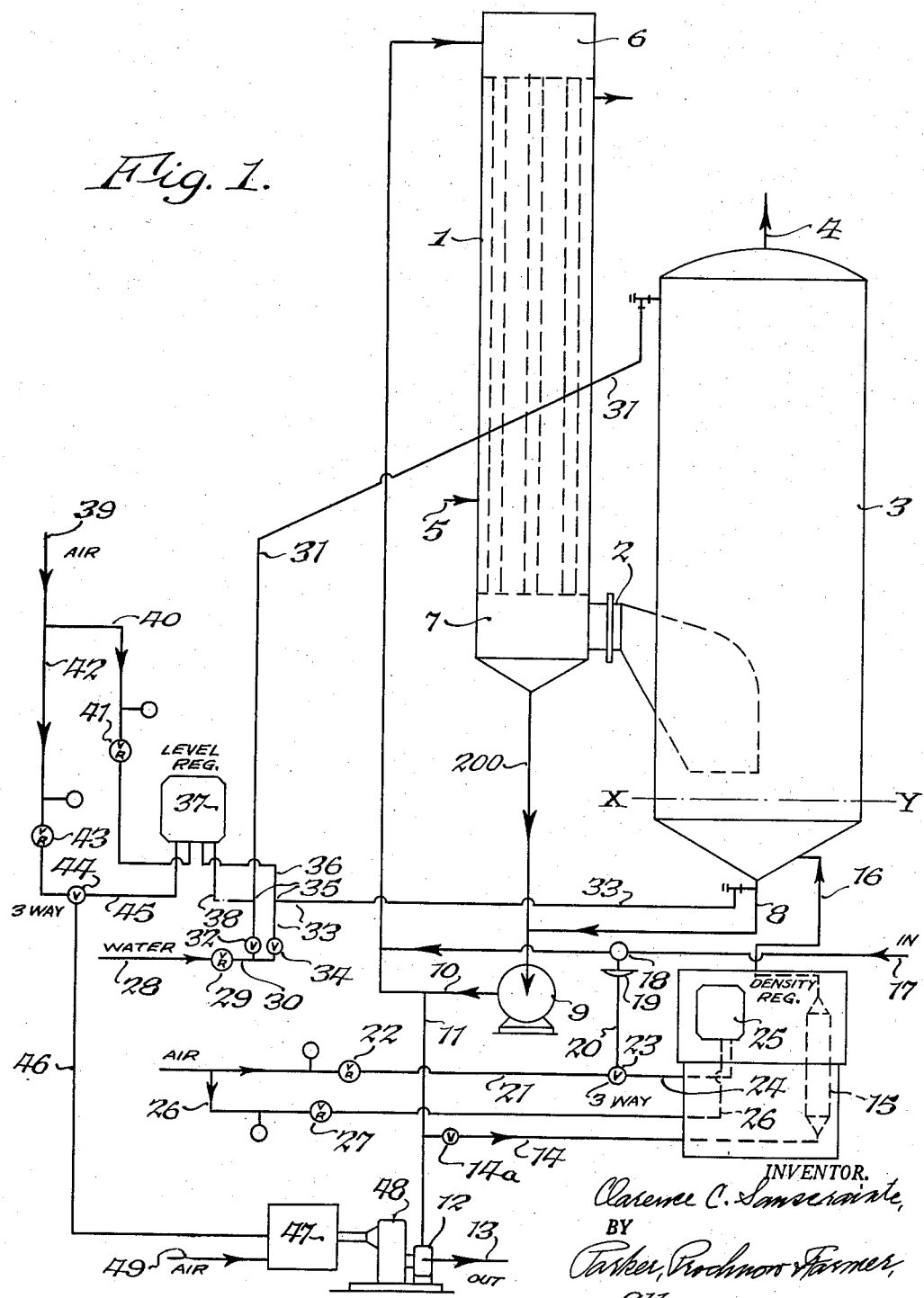
Fig. 1 is a side elevation of part of an evaporator of the down flow, continuous type having incorporated therein a density controller connected in accordance with this invention, the parts being largely shown rather diagrammatically.

In the illustrated embodiment of the invention, and referring particularly to Fig. 1, the evaporator or evaporator unit shown is of the single effect, down flow type of continuous evaporator, having a steam chest or heater 1, connected at its lower end by a duct 2 to the chamber of a separator 3. Evaporators of any other suitable or desired type may be employed. The separator may be under a partial vacuum, so that vapors separated from the liquid in separator 3 are drawn off through a conduit 4 leading to a source of vacuum, not shown. Steam is supplied to the steam chest through a pipe 5. The steam in the chest 1 circulates around tubes through which the circulating liquid being processed descends from the upper header 6 of the steam chest 1 to the lower header 7 thereof. Liquid is withdrawn from the bottom of the separator by a pipe 8, and is connected to the intake side of a continuously driven pump 9. The pump 9 is operated by a suitable motor, not shown, and its outlet port is connected to a pipe 10 which leads to the upper header 6 of the steam chest 1. Pump 9, therefore, withdraws liquid from the bottom of the separator 3 and delivers it to the top of the steam chest, so as to produce a continuous recirculation of the liquid being processed in the evaporator.

Leading from the pipe 10 is a pipe 11 which is connected to the intake side of a pump 12 having an outlet pipe 13 which delivers concentrated liquid in its final condition to a suitable reservoir. Leading from the pipe 11 is a branch 14 which includes a valve 14a and leads to the lower end of a constant volume vessel 15, the upper end of which is connected by a pipe 16 to the lower end of the separator 3. Some of the liquid being recirculated by the pump 9 is bypassed through the constant volume vessel 15 back to the separator and therefore the liquid passing upwardly through the vessel 15 always corresponds in density to the density of the liquid leaving the bottom of the separator. This bypass circuit through the vessel 15 might be termed a sampling device or sampler, since it automatically and continuously samples the liquid being withdrawn from the bottom of the separator 3. When the pipe 200 is employed, as hereinafter explained, then the density of liquid passing through chamber 15 is that of a mixture of separator and heater liquids.

Fresh liquid to be processed or fresh stock liquid is supplied through a pipe 17 leading to the pipe 10 between the point of connection of pipe 10 to the pipe 11 and the upper header 6 of the steam chest. Fresh liquid is therefore continuously delivered to the recirculating stream of liquid which is delivered to the top of the steam chest to be heated. Included in series in the pipe 17 is a valve 18 which is operated by an air motor 19 which receives its operating air from a pipe 20. Pipe 20 is connected to an air suply pipe 21 which, in turn, is connected to any suitable source of air under pressure. The air passing along the pipe 21 must pass through a pressure regulating valve 22, so that the air pressure in pipe 21 will be uniform. A 3-way valve 23 is included in the pipe 21 at its connection to the pipe 20. The 3-way valve is also connected to a pipe 24 which leads to a control device 25 which will be explained later herein, and which is shown diagrammatically in Fig. 4 of this specification. Air under pressure from the source, not shown, is also supplied to pipe 26 which passes through a pressure regulating valve 27 and leads to the control device 25. The 3-way valve 23 is normally set to connect the pipes 20 and 24, and disconnect both of them from the pipe 21. Turning of valve 23, however, will connect pipes 20 and 21 and disconnect both of them from pipe 24. This operation of the valve 23 is only used when starting up the apparatus, and during normal run is left in its first described position, in which it connects pipes 20 and 24.

A source of fresh water under pressure is supplied through pipe 28, and this water passes through a pressure regulating valve 29 to enter a supply pipe 30. Pipe 30 is connected by a branch 31 to the upper part of separator 3, well above the maximum liquid level therein, and just above the connection of pipe 31 with pipe 30 it is provided with a valve 32 which may be a manually operable valve. Another branch 33 leads from pipe 30 to the lower part of the separator 3, and is shown for convenience as connected to the pipe 8 close to the separator 3. This branch pipe 33 is provided with a valve 34 which may also be manually operable. The valves 32 and 34 are cracked open just enough to allow a slight trickle of fresh water into separator 3, which keeps those pipes 31 and 33 clear of any of the liquid being processed but at the same time the column of liquid in pipes 31 and 33 will be subject to the pressure of the column of liquid in separator 3, which may be under a partial vacuum.

The pipe 33 is connected at a selected level point 35 which is below the liquid level in separator 3, to a pipe 36 that leads to a level regulator 37. This liquid level may be approximately as indicated by broken line X—Y in Fig. 1. A pipe 38 is connected to the pipe 31 at the same level 35, and this pipe 38 leads also to the level regulator 37. Compressed air is also supplied through a pipe 39, which has a branch 40, provided with a pressure regulating valve 41, leading to the level regulator 37. Another branch 42 of the pipe 39 has a pressure regulating valve 43 in series therein, and then is connected to one port of a 3-way valve 44. Another port of the valve 44 is connected by a pipe 45 to the regulator 37, and the third port of valve 44 is connected by a pipe 46 to a precisor 47 which, in turn, controls a variable speed drive 48 by which the pump 12 is driven at variable speeds. Air under pressure is also supplied to the precisor 47 through a pipe 49.

Figures 2, 3:
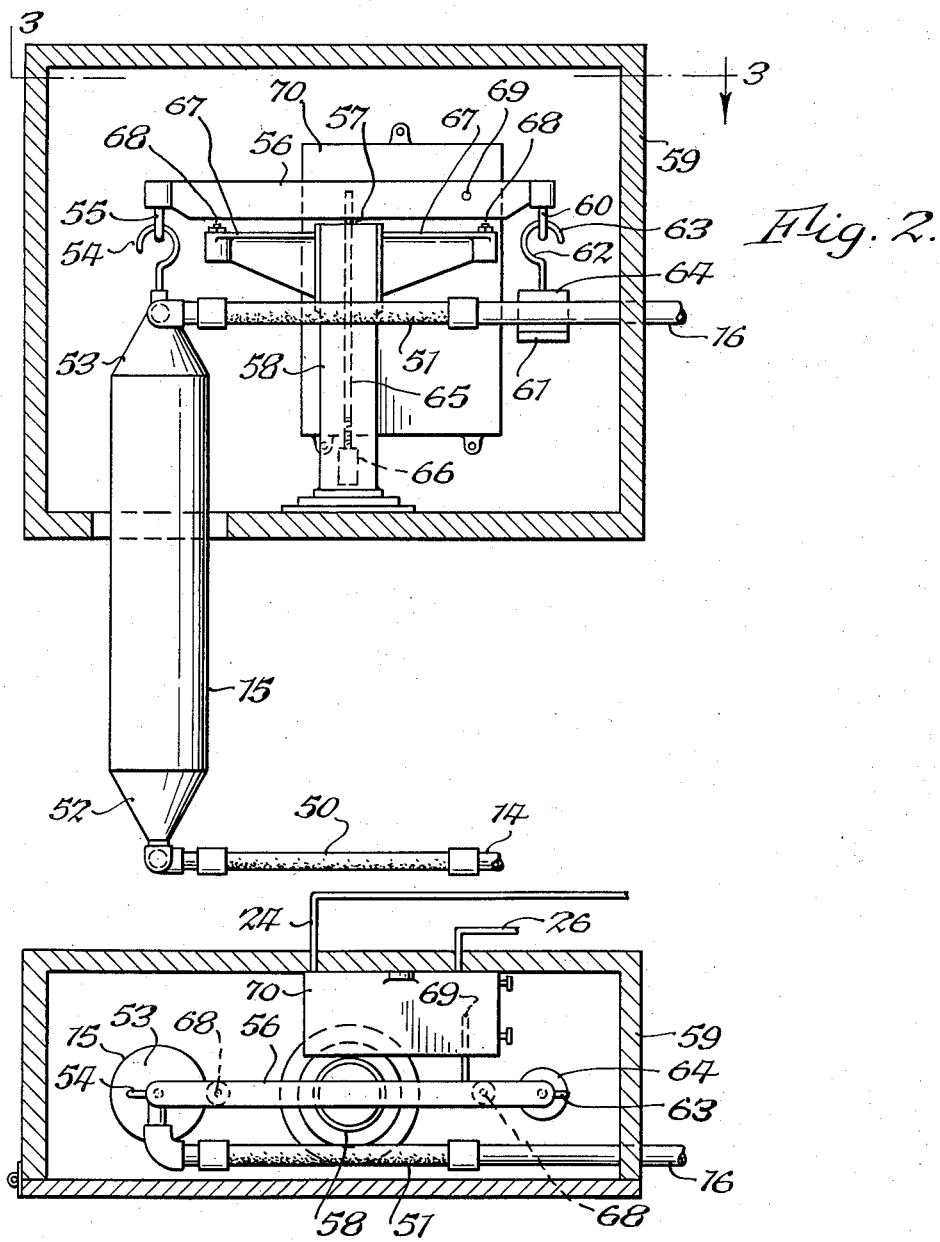
Fig. 2 is a sectional elevation through part of one of the controlling mechanisms shown in Fig. 1.
Fig. 3 is a sectional plan of the mechanism shown in Fig. 2, where the section is taken approximately along the line 3—3, Fig. 2.

Referring next to Fig. 2, the pipe 14 which leads to the bottom of the vessel 15 is connected to the bottom of the vessel 15 by a flexible or rubber hose or conduit 50 which extends horizontally to the vessel 15 when the vessel 15 is in its normal, balanced position. Similarly, the pipe 16 which leads to the upper end of the vessel 15 is connected thereto by a similar flexible or rubber hose 51. The vessel 15 has a conical bottom 52 and a conical top 53, and the passage from the hose 50 opens into the small end of the cone and the hose 51 opens into the small end of the upper cone 53. With this arrangement there will be no dead pockets in vessel 15 in which circulating liquid may collect, and vessel 15 will have substantial capacity to make it sensitive to small changes in density.

The upper end of vessel 15 carries a hook 54 which engages in an eye 55 depending from a scale or weigh beam 56 which is rockably mounted on a fulcrum 57 at the top of a pedestal 58, supported within a housing or casing 59. The opposite end of the beam 56 is provided with a depending eye 60 and a platform 61 is provided with an upstanding stud 62, terminating in a hook 63 that engages in the eye 60. A plurality of different weights 64 are individually and removably mounted on the platform 61 so that the vessel 15, beam 56 and platform 61 and the weights 64 constitute a balance scale for weighing the contents of vessel 15. The beam carries a depending arm 65 which is provided on its lower end with a weight 66 that is adjustable vertically along the rod 65, such as by having the weight 66 threaded on the lower end of the rod 65. The arm 65 and weight 66 constitute a pendulum imparting stable equilibrium to the balance and providing means for adjusting the vertical location of its center of gravity with respect to the fulcrum. The pedestal is provided with branch arms 67 which carry adjustable stops 68 disposed beneath the ends of the beam 56 to limit rocking movement of the beam.

The beam 56 is provided with a laterally extending stud 69 which projects into a casing 70 which is supported within the housing 59. Within the housing 70 is the regulating mechanism designated collectively by the reference numeral 25, Fig. 1, which is of the type shown in U. S. patent to Tate et al. No. 2,361,885, granted Oct. 31, 1944, to which reference may be had for a full disclosure thereof. The essential parts of this mechanism with which this invention is concerned are illustrated diagrammatically in Fig. 4, so as to illustrate the manner in which they are associated with the other parts of this apparatus and to explain the principle of operation. This mechanism such as shown in the Tate patent is marketed by Taylor Instrument Companies of Rochester, N. Y., under the name "Taylor Fulscope Recording Controller" series 115 R to 124 R, and is also disclosed in a bulletin on instructions for that instrument published by Taylor Instrument Companies and copyrighted in 1939. The bulletin is identified by No. 92037.

Referring now to Fig. 4, having a diagram of the parts contained in the housing or casing 70, the pin 69 extends into and along a passage in a block 71 and is removably secured therein by a set screw 72. This block 71 is hinged by pin 73 to one end of a link 74, the other end of which is hinged by pin 75 to one arm of a lever 76, which is pivoted at 77. The other arm of this lever 76 is connected by pivot pin 78 to one end of a link 79, the other end of which is pivotally connected by pin 80 to an arm of a lever 81 which is pivoted at 82. The lever 81 carries an indicating arm 83 which moves over a dial or scale, so as to give a visual indication, as illustrated in said Tate patent. The lever 81 operates a link 84 which, in turn, is connected by a hinge pin 85 to a baffle or flapper 86, disposed at its free end in front of a nozzle 87 at the end of a pipe 88. The baffle 86 is also hinged at 89 to a stem 90 which projects from a plate 91. The plate 91 is connected to the rear end of a bellows 92 and also to an intermediate part of a bellows 93, as shown in Fig. 16 of said Tate patent. The forward ends of the bellows 92 and 93 are closed by a member 94 and the rear end of bellows 93 is connected to a member 95. The members 94 and 95 are connected by a peripheral wall 96 to form a housing. A conduit or pipe 97 connects a chamber B within the bellows 92 to a reset device 98. The chamber A within the bellows 93 is connected by a pipe 99 to a sensitivity regulator 100.

The pipe 88 is connected through a constriction 101 to the pipe 26 see also in Figs. 1 and 3 from a source of compressed air at a uniform pressure, so that compressed air passes slowly through the constriction 101 and escapes through nozzle 87 at a rate determined by the position of the baffle 86 in front of it. The pipe 26 also leads to a relay valve 103 having opposed seats 104 and 105. The pipe 26 opens through the seat 104 and a vent passage 106 opens through the seat 105. The space of the relay valve 103 between the seats 104 and 105 is connected to the pipe 24 noted in connection with Fig. 1. A branch 108 leads from pipe 24 to the sensitivity regulator 100 so as to open into a chamber 109 thereof. This chamber is created by a partition 110 across the interior of the regulator 100, and the other chamber 111 of that regulator is connected to the pipe 99. The partition 110 has a port 112 opening from face to face thereof, so as to provide for communication between the chambers 109 and 111.

A valve element 113 has a tapered end 114 extending through the port 112, so that by shifting valve element 113 endwise, the effective opening or clearance in the port 112 may be varied. A compression spring 115 acts between the casing of the regulator and the valve 113 to urge the latter in a direction to close off the port 112 by carrying the larger cross-sectional part of the stem 114 through the opening 112. An adjustable screw 116 is threaded through the casing of that regulator, so as to abut endwise against the small end of the stem 114 and limit its movement through the opening 112 under the urging of spring 115. By adjusting the screw 116, one automatically regulates the effective passage through port 112.

Another branch pipe 117 leads from the pipe 24 to a chamber 118 of the reset device 98. This device 98 has a partition 119 across its interior to separate the chamber 118 from another chamber 120. The partition 119 has a port 121, and a valve element 122 disposed in chamber 120 has a tapered stem 123 which extends through this port 121 until its small end engages against an adjustable screw 124. A compression spring 125 urges the valve element 122 against the screw 124. The chamber 120 of the reset 98 is connected to the pipe 97. Within the chamber of the relay valve 103 is a ball head or valve 126 carried on the end of a stem 127 that extends along the passage 106 and is connected at its outer end to a bellows 128. The interior of the bellows is connected to the pipe 88 between the construction 101 and the nozzle 87.

When the weight of the liquid in vessel 15 overcomes the weights on the other end of the beam, the scale beam will rock counterclockwise in Fig. 2, and carry the pin 69 upwardly. As shown in Fig. 4, upward movement of pin 69 lifts link 74 and rocks lever 76 clockwise so as to pull downwardly on link 79. This rocks lever 81 counterclockwise and tends to rock the baffle 86 counterclockwise about pivot 89 away from the nozzle 87. Air under pressure, which passes from pipe 26 through constriction 101 into pipe 88 will escape more rapidly from nozzle 87 and this reduces the pressure in bellows 128 which had built up when escape of air was more restricted from nozzle 87. Bellows 128 will then collapse and pull ball valve 126 toward the seat 105 and away from seat 104. This restricts the escape of air through vent passage 106 and allows more air to pass more freely from pipe 26 through seat 104 into pipe 24. Pressure in pipes 24 will then build up and this pressure is transmitted by pipe 108 to chamber 109 of regulator 100, and also is transmitted by pipe 117 to the chamber 118 of reset 98. The air under pressure in chamber 109 will escape slowly through port 112, at a rate determined by the setting of the valve 113 into chamber 111, and thence by pipe 99 to the bellows A so as to force the plate 91 to the left in Fig. 4.

The pivot 89 of the flapper or baffle 86 is thus shifted in a direction to cover somewhat the port 87, and restrict the escape of air from port 87. This causes pressure to build up in bellows 128 again and shift ball valve 126 back toward the seat 104 and slow down the build-up of pressure in pipe 24. At the same time the air from pipe 24, which entered the reset 98 will pass through port 121, at a rate determined by the setting of valve 122 into chamber 120 and then by pipe 97 to the chamber B of the bellows 92. This pressure in chamber B of the bellows 92 acts in opposition to the pressure in chamber A of the bellows 93. Since the valve elements 113 and 122 are seldom set exactly the same, the pressure in the chambers A and B will build up at different times and thus jointly control the position of the baffle 86. Pressure in chamber B tends to force the pivot 89 to the right and uncover the port 87. Thus the build-up of pressure in pipe 24 will be progressive but not abrupt.

The link 79 of this specification corresponds to the link 9 of said Tate patent, so that in the Tate patent the Bourdon tube 7 is disconnected at 8 from the link 9, and the lower end of the link 9 of that patent connected by pin 78 of this specification to the lever 76. It will thus be observed that as the pin 69 is lifted it causes a build-up of pressure in the pipe 24. When pressure is built up in the pipe 24 it passes through the 3-way valve 23 and pipe 20 to the air motor 19, where it causes further opening of the valve 18 so as to allow more fresh liquid or stock to enter through pipe 17 into pipe 10, to join the liquid being recirculated through the evaporator, and this decreases the density of the liquid passing through the vessel 15 of the density regulator. This decrease in weight then causes the weigh beam shown in Fig. 2 to rock clockwise and lower the pin 69. When pin 69 is lowered, it rocks lever 76 counterclockwise and lever 81 clockwise and thus rocks the baffle 86 closer to the jet port 87.

This causes pressure to build up in pipe 88, and bellows 128 will then expand and shift valve 126 toward the seat 104 to restrict the air from pipe 26 passing into pipe 24 and opening the vent 106 further so as to reduce the pressure in pipe 24. This reduced pressure is then communicated through pipe 20 to the air motor, and when the pressure is released a spring in the motor 19 will effect a partial closing of the valve 18. Thus, the position of the valve 18 is directly responsive to the weight of the liquid being circulated through the vessel 15, and hence corresponds to the density of the liquid leaving the bottom of the separator 3. The inflow of fresh stock or liquid is thus controlled by the density of the liquid leaving the bottom of the separator 3.

The level regulator 37 (Figs. 1 and 5) is enclosed in a housing which contains mechanism similar to that shown in Fig. 4, and similar to that shown in the Tate et al. patent, except that the control is obtained by the position of the flapper or baffle 129, which corresponds to the flapper or baffle 86 of Fig. 4, and the baffle 129 has a shiftable fulcrum 130 which corresponds to fulcrum or pivot 89 of Fig. 4, that is carried on a stem 131 which corresponds to the stem 90 of Fig. 4. The baffle 129 is shifted toward and from the jet port 132 at the end of a pipe 133 that corresponds to the jet port 87 and pipe 88 of Fig. 4. Baffle 129 is operated by a link 134 from a lever 135 which is pivoted at 136. This lever 135 has an arm 137 that is disposed between opposed bellows 138 and 139. The position of the arm 137 will thus depend upon the relative pressures in the bellows 138 and 139. The bellows 138 is connected to the pipe 38, Fig. 1, and the bellows 139 is connected to the pipe 36, Fig. 1. Since the pipe 38 is responsive to the pressure caused by the weight of the column of liquid in pipe 31, the bellows 138 will be under a pressure that corresponds to the weight of the column of liquid in pipe 31 above level 35.

The pipe 36 is connected to the lower end of the separator, so that the pressure in bellows 139 will correspond to the weight of the column of liquid in the pipe 33, pipe 8 and separator 3. When the liquid level in the separator 3 falls, the pressure in the bellows 139 will fall, and bellows 138 will rock the baffle 129 and thus control the pressure of air delivered through the pipe 45 of Fig. 1 to the pipe 46 and precisor 47. The pipe 40 of Fig. 1, in this instance, corresponds to the pipe 26 of Fig. 4. Thus the regulator 37, by mechanism such as shown in Fig. 4, is caused to vary the air pressures in the pipes 45 and 46 which are delivered to the precisor 47.

The precisor 47 is shown in greater detail in Fig. 6, and is substantially the same in principle as that described in U. S. patent to Edwards et al. No. 2,298,112 of Oct. 6, 1942, to which reference may be had for a more complete disclosure thereof. Air under regulated pressure is delivered through pipe 49. The pipe 46 leads to a bellows 140 which acts against a spring pressed pin 150. Disposed between the bellows 140 and pin 150 is one end of an arm 151 which extends laterally from the bellows and is connected at 152 to one end of a leaf spring 153, the other end of which is fastened to free end of a lever 154 that is connected by a frictionless hinge 155 to the housing. The arm 151 carries a bracket 156 through which is threaded a screw 157, and the end of the screw 157 engages against a baffle plate 158 which is hinged by a flexible strip 159 to an inverted bridge 160 that is provided on a yoke 161.

The yoke 161 has one part connected to a diaphragm 162 and another part connected to another diaphragm 163. The diaphragms 162 and 163 are thus connected at their centers by the yoke 161 and flex together. The diaphragms 162 and 163 extend across a housing 164 and form chambers F and G therein. Chamber F is separated from G by the diaphragm 162, and the yoke has a passage 165 therethrough. The pipe 49 extends through the casing 164 and terminates in chamber G in a port 166. A branch pipe 167 leads from pipe 49 to chamber F. Another pipe 168 leads from chamber F and terminates in a jet port 169 in front of the baffle or plate 158. The yoke 161 is provided with a vent passage 170, and a valve element 171 reciprocates loosely in passage 170. At its inner end element 171 terminates in a conical head 172 which moves into and out of the port 166 to restrict air flow therethrough. The valve element 171 at its outer end has a valve head 173 which is also tapered and goes into and out of the outer end of the passage 170, so as to restrict the escape of air through passage 170.

A spring 174 reacting between bridge 160 and valve head 173 urges the valve element 171 upwardly in Fig. 6 towards its seats. The spring 175 is connected to the end of arm 151, which is connected at 152 to the leaf spring 153, so as to urge the free end of arm 151 upwardly. A pipe 176 leads from the chamber G to an air motor 177 having a diaphragm 178 against which the air pressure delivered by pipe 176 is exerted. A tube 179 is slidingly supported by a spider 180, and at one end it carries a plate 181 which abuts against the diaphragm 178. A spring 182 surrounds the sleeve 179 and is compressed between the spider 180 and the plate 181 so as to oppose the outward flexing of the diaphragm 178 by air pressure in the motor 177. This sleeve carries a collar 183 which is adjustable therealong in any suitable manner, such as by a set screw, and this collar is provided with an arm 184 that extends laterally therefrom and is pivotally connected by the pin 185 to one end of a link 186. The other end of the link 186 is pivoted by pin 187 to the free end of lever 188 which is pivotally mounted at its other end by a pin 189 on the housing of the precisor. Pin 189 is therefore a relatively stationary pivot for lever 188.

Disposed between the lever 154 and lever 188 is a shiftable pin 190 which has a knurled periphery that is disposed between the levers 154 and 188. By turning the pin 190 it will roll between the levers 154 and 188, either to the left or to the right in Fig. 6, and thus serves as a movable fulcrum. When air under pressure is delivered through pipe 46 from the regulator 37, it will expand the bellows 140 against the action of the spring-pressed pin 150 and thus rock the arm 151 upwardly to lift the bracket 156, the other end of the arm 151 being connected to the free end of the lever 154. The plate 158 is always in contact with screw 157, and thus when the left hand end (Fig. 6) is lifted, plate 158 will move closer to port 169 and restrict the escape of air from that port. The pipe 167 is provided with a constriction 191. Air from pipe 49 is always passing through constriction 191 into chamber F and then is escaping through port 169 of pipe 168. When plate 158 moves nearer the port 169, less air can escape and pressure will build up in chamber F, and this will flex the diaphragm 162 downwardly in Fig. 6.

The valve element 171 will then be carried downwardly and will open port 166 so that some of the compressed air from pipe 49 may enter chamber G and then pass through pipe 176 to the air motor 177. This will cause an advance of the sleeve 179, and the sleeve through link 186 will pull downwardly on the lever 188, and the latter will act through shiftable fulcrum 190 to depress the free end of lever 154 and carry the right hand end (Fig. 6) of arm 151 downwardly against the action of spring 175. This will shift bracket 156 downwardly and, through screw 157, will shift plate 158 away from port 169. This allows more air to escape from chamber F, which decreases the pressure so that the external pressure can then shift the diaphragm 162 upwardly and return valve head 172 into port 166. This cuts down the rate of entry of air into chamber G, and thence through pipe 176 to the air motor 177. When the valve element 172 seats in port 166, any further movement of the diaphragm will open passage 170 and release pressure from chamber G so that the pressure on the air motor 177 will fall.

When the pressure in pipe 46 is cut down, bellows 140 will collapse somewhat under the pressure of pin 150, and this carries screw 157 in a direction to flex plate 158 away from port 169 so that pressure in chamber F will fall and diaphragm 162 can relax and carry the yoke upwardly in Fig. 6. As this happens, the bridge 160 will rise and tend to rock the plate 158 about the set screw 157 as a fulcrum and restrict escape of air through port 169. This slows down release of pressure from chamber F so that the pressure on the motor 177 will not be released too rapidly. Thus, with this precisor, one obtains adequate pressure on the motor 177 to cause an advance of the sleeve or tube 179 promptly, but its advance is regulated by the mechanism illustrated in Fig. 6, so that it will not advance too rapidly and overrun an equilibrium position which would cause hunting. It will cause a variable pressure on the motor 177, and thus advance the sleeve or tube 179 a distance, depending upon the pressure of air in pipe 46, and hold it in that position until the pressure further rises or falls in pipe 46.

The sleeve 179, by its endwise movement, acts upon a variable speed mechanism 48 so as to vary the speed at which the motor, not shown, drives the pump 12. Variable speed mechanisms of this type are well known on the market and any of them may be used. One such variable speed drive is marketed by Reeves Pulley Co. of Columbus, Ind. and is illustrated and described in its Catalogue No. N-441. Other examples of suitable variable speed drives of this type are described in U. S. Patent Nos. 2,089,711 of Aug. 10, 1937 and 2,140,942 of Dec. 20, 1938, to which reference may be had for more complete details as to the same. Thus, the speed of the pump 12 is controlled by the level regulator 37 through the precisor 47, and the regulator 37 is directly responsive to any variations in the liquid level in the separator 3.

In starting up the mechanism, the 3-way valve 44 may be operated to disconnect the level regulator from the precisor 47 and deliver full air pressure directly to the precisor 47, in order that the pump 12 will be shut down entirely or operated manually very slowly until the desired density has approximately been reached, at which time the valve 44 may be operated to place the precisor 47 back under the control of the regulator 37. At the start, the 3-way valve 23 may also be operated to disconnect the pipes 20 and 24, and connect the pipe 20 to the pipe 21 so as to place full air pressure on the motor 19 and open the valve 18 to any desired extent. This permits fresh liquid to enter the system rapidly and when the desired density has been reached, valve 23 will be turned to reconnect pipes 20 and 24, so that the motor 19 is placed under the control of the density regulator 25.

It is believed that the operation of the apparatus will be clear from the foregoing description. It will be noted, however, that the in-going fresh liquid will enter through the valve 18 under the control of the density regulator, so that the admission of fresh liquid will be always just sufficient to keep the density of the liquid in the separator at the desired density of the liquid to be withdrawn through the pipe 13. The speed of the pump 12 will be regulated by the liquid level regulator 37 so that as the liquid level tends to rise, the pump 12 will be speeded up sufficiently to keep the liquid level in the separator at the desired level. This provides a very sensitive regulation of the density, and the output of condensed liquid is controlled by the liquid level. In this manner a more accurate regulation of the density is provided than has heretofore been possible.

When starting up the evaporator after a desired quantity of juice is admitted to the evaporator, the juice or liquid in the vessel 15 will not be up to the desired concentration. Hence, the inlet valve 18 will be kept closed by the motor 19 under the control of the density regulator mechanism. The valve 23, however, is operated to open this valve and allow the liquid to enter the evaporator unit and maintain a constant level, while the liquid is coming up to the concentration. When the liquid is almost up to the desired concentration, the manual valve 23 is turned so as to restore motor 19 to the control of the density regulator. At this point the regulator automatically controls the density by controlling the flow of fresh liquid to the evaporator unit. If the discharge pump 12 is not started at this point, the level will gradually build up in the evaporator unit because the density will be kept constant by the continuous admission of feed liquid.

When the indicating needle of the level regulator 37 comes up to the set pointer, as explained in the Tate patent, the discharge pump is started, such as by pressing the suitable starting button by hand, and the level regulator 37 then proceeds to maintain a constant, predetermined level in the evaporator. The air pressure required on the pump control diaphragm to provide the maximum speed of the pump that will remove finished product at a rate at which it is produced, should be determined, and the air supply to the controller or regulator 37 is then set at one pound above this pressure through suitable regulation of the valve 41. This eliminates the possibility of discharging the liquid too rapidly in case of a slight upset in the level control instrument.

The operation of this system and the remarkably precise control which it provides is well illustrated by its application to a double effect vacuum evaporator for concentrating orange juice. Raw orange juice at about 13 degrees Brix was fed to the second effect in which it was partly evaporated and delivered to the first effect in which it was brought to a concentration of 50 degrees Brix. The first effect was provided with a gravity controller 25 regulating the valve 18 which delivered solution from the second to the first effect, and also with a discharge pump 12 under control of a level controller 37 as described above. This evaporator was operated continuously at a rate evaporating about 510 gallons of water per hour. The juice discharged was maintained automatically at the desired concentration to within plus or minus 0.05 Brix degrees, as indicated by independent test of samples removed from time to time of the product effluent from the first effect, which confirmed the gravity indicated on the control instrument 25. To finish up concentrating a given supply of raw juice, after the feed of raw orange juice was discontinued, feed of pure water was substituted for juice and evaporation continued at the same continuous rate. The concentration of juice in the second effect was thus gradually diluted and in the course of time the second effect contained only water, which of course was thereafter the feed to the first effect. It will be apparent that when the feed is clear water, and the juice in the first effect is at the desired gravity, all the feed is evaporated without raising the level in the separator 3, if the discharge pump 12 is stopped. After the pump 12 was stopped the evaporator was allowed to continue to run for two hours; the juice in the separator 3 of the first effect remained constant at 50 degrees Brix, the valve 18 automatically admitting water at such rate as to exactly balance the evaporation in the heater 1 of that effect. The density regulator thus automatically regulated the feed in this test run over a range from partially concentrated juice to pure water so as to maintain a product concentration constant at all times to within plus or minus 0.05 Brix degrees in any sample selected.

Any slight upset movement in the level control instrument cannot in any way affect the density of the finished liquid, and it merely changes the position of the level for the duration of the upset because the level control instrument, in turn, controls the pump speed. Regardless of the position of the liquid level in the evaporator, the density will be held constant, because the density controller controls the flow of fresh or diluting liquid into the evaporator. Any changes in the density of feed to the evaporator will not upset the density controller because it will merely allow a greater or lesser quantity of liquid to flow to the evaporator unit, as called for by the density regulator. In the case of a multiple effect evaporator, this arrangement is applied to the effect in which the finished liquid is produced. The other effects are merely provided with liquid level controllers only. Fluctuations in the level or concentration in these other effects will not affect the concentration of the liquid in the finishing effect, and thus control of the level of the liquid in these other effects within a range of three inches is sufficiently close.

The density of the finished liquid may be varied any desired amount by adding or removing weights on the balance 64 on the density control instrument in the manner described in the Tate patent, the slight amount required to obtain this desired change in density. The level in the evaporator can be changed to any position desired by merely moving the set pointer of the level controller the desired amount. If the capacity of the evaporator increases or decreases while in operation, such as by an increase or decrease in the steam pressure in the steam chest, one need only increase the air input to the level indicating controller so that the discharge pump 12 has a slightly greater operating range. If the steam pressure is increased, this will cause an increase in the amount of water evaporated. As a result, the level will drop and the discharge pump will slow up. At the same time the increased evaporation will increase the density of the liquid which will cause the feed valve to open and the level to increase until the pump starts to speed up. If now the maximum speed of the pump is not sufficient to handle the discharge at its maximum speed, the air output can be increased to increase the operating range to a somewhat higher lever. This method of density control is fully automatic, and extremely accurate and uniform. If found desirable, a line 200 running from the bottom of the steam chest 1 to the inlet line 8 of the pump 9 may be provided. This will provide a return to the pump for recirculation in the system of part of the liquid leaving the tubes in the steam chest, thereby reducing the amount of liquid to be separated from the vapor in separator 3, and eliminating a dead pocket in chamber 7.

It will be noted from Fig. 4 that the baffle member 86 is physically disconnected from the pipe 88 and nozzle 87, yet member 86 controls and regulates the escape of air and thereby controls the fluid pressure in pipe 24. Thus one has a freely movable control part, and a device controlled thereby yet having no operating physical connection directly thereto. This gives an exceptionally sensitive control of the pilot means by the freely movable member. The fluid control of Fig. 4 regulated by baffle member 86 is a pilot device which, through fluid under pressure admitted to pipe 24 and passed to the power operated valve 19, controls the latter. This mechanism shown in Fig. 4 may, for convenience, be designated as an air operated, throttling type, automatic controller.

It will be understood that various changes in the details and arrangements of parts which have been herein described and illustrated in order to explain the nature of the invention, may be made by those skilled in the art within the principle and scope of the invention as expressed in the appended claims.

I claim:

1. In a continuous vacuum evaporator for concentrating solutions to a predetermined density of the type including a dilute solution feed line, and an evaporating unit including a separating chamber and subject to ordinary uncontrollable variations in liquid level due to extraneous influences normally incident to vacuum operation, the improvement for use therewith comprising in combination a discharge pump having its intake side in communication with said separating chamber to remove concentrated solution from the evaporator, means for driving the said discharge pump at variable speeds, an air motor controlling said driving means to increase and decrease the speed at which the said pump is operated with variations in the air pressure on said motor, and means responsive to the liquid level in said separating chamber for varying the air pressure on said air motor as said liquid level varies and increasing and decreasing the speed of the pump directly proportionally with increases and decreases in the liquid level, but including means for opposing rapid changes in said air pressure and thereby avoiding hunting of said variable speed means.

2. In a continuous type solution concentrating device having an evaporator, a dilute solution feed line leading to said evaporator, a discharge line for discharging concentrated solution from said evaporator, and means for continuously withdrawing concentrated solution from said evaporator and returning it to the evaporator for recirculating solution through said evaporator, that improvement which comprises the combination for use therewith of said feed line having therein a valve by which the rate of feed of fresh solution through said feed line may be varied, an air motor connected to and operating said valve according to the air pressure thereon, branch means for receiving a part of the withdrawn concentrated solution and returning it to said evaporator through a constant volume, closed vessel, means for continuously weighing said vessel and contents, means responsive to said weighing means for controlling the air pressure on said valve and controlling the flow of dilute solution into said evaporator at a rate which maintains a constant density of the solution in said evaporator by increasing or decreasing the valve flow area with increase or decrease of the weight of the solution in said vessel, means including a pump for permanently withdrawing a part of the concentrated solution from the said continuously recirculating solution, means responsive to the level of liquid in said evaporator for controlling the operation of said pump to maintain a constant level of liquid by respectively increasing or decreasing the pump output with rise or fall of the liquid level in said evaporator, each of said responsive means including a control instrument of the proportional reset type and having a stream of fluid under pressure, a freely movable member shiftable to restrict or release said stream of fluid under pressure, and means responsive to the restriction or release of said fluid for controlling said valve in the feed line for one responsive means and for controlling the operation of said pump for the other responsive means.

3. In a continuous solution concentrating device of the type having an evaporator, a dilute solution feed line leading to the upper part of said evaporator, and a discharge line for removing concentrated solution from the lower part of said evaporator, that improvement in the control of the density of the removed concentrate which comprises the combination for use therewith of means connected to the dilute solution feed line for feeding solution to be concentrated to said evaporator at variable rates, means connected to said discharge line for removing concentrated solution from the evaporator at variable rates, a liquid recirculating circuit having liquid moving means therein connected at its ends to different parts of the evaporator and having a closed, constant volume vessel in series therein to continuously sample the solution in process in said evaporator; pilot controlled, power operated means controlled by variations in density in said vessel for operating said solution feeding means, that feeds solution to said evaporator continuously at a rate that keeps constant the density of the solution in said evaporator; and pilot controlled power operated means automatically controlled by variations in the level of liquid in said evaporator for operating said solution removing means, that removes concentrated solution from said evaporator, continuously at a rate that keeps constant the liquid level in said evaporator.

4. In a continuous solution concentrating device of the type having an evaporator, a dilute solution feed line leading to the upper part of said evaporator, and a discharge pipe for removing concentrated solution from the lower part of said evaporator, that improvement in the control of the density of the removed concentrate which comprises the combination for use therewith of means for feeding solution to be concentrated through said feed line to said evaporator at variable rates, means for removing concentrated solution from the evaporator through said discharge pipe at variable rates, means including a liquid recirculating circuit connected at its ends to different parts of the evaporator and having a closed, constant volume vessel in series therein to continuously sample the concentrated solution in process in said evaporator, pilot controlled, power operated means automatically controlled by variations in density in said vessel for operating said solution feeding means, that feeds solution to said evaporator continuously at a rate that keeps constant the density of the solution in said evaporator, pilot controlled, power operated means automatically controlled by variations in the level of liquid in said evaporator for operating said solution removing means, that removes concentrated solution from said evaporator, continuously at a rate that keeps constant the liquid level in said evaporator, and means for temporarily partially nullifying the effect of excessive level variations on the rate of removal of concentrated solution from the evaporator.

5. In a continuous solution concentrating device of the type having an evaporator, a dilute solution feed line leading to the upper part of said evaporator, and means for removing concentrated solution from the lower part of said evaporator, that method of controlling the density of the concentrated solution being removed, which comprises continuously sampling the solution in said evaporator, regulating the continuous feed of solution to be concentrated to the evaporator to a rate that keeps constant the density of the sampled solution by increasing the amount of solution fed when the sampling senses that the density is higher than a set standard and by decreasing the amount of solution fed when the sampling senses that the density is less than the set standard, regulating the continuous removal of concentrated solution from the evaporator to a rate which keeps constant the liquid level in said evaporator by increasing the rate of continuous removal of concentrated solution when the level increases and decreasing such rate of removal when the level decreases, modifying the regulation of the continuous removal of concentrated solution for temporarily reducing to some extent the effect of excessive level variations on the rate of removal of the concentrated solution and modifying the regulation of the continuous feed of solution to the evaporator for temporarily reducing to some extent, the effect of excessive variations in the density of the sampled solution upon the rate of feed of solution to be processed.

6. In apparatus for continuously modifying a stream of liquid in process to discharge it with a selected uniform density, the combination of a modifying chamber through which said stream is passed, liquid sampling means including a closed circuit having in series therein a constant volume vessel and said chamber, for continuously recirculating liquid in said closed circuit with said vessel and said chamber, means for variably modifying the rate of flow of said liquid in said stream to said chamber, means for variably modifying the density of the liquid in said chamber, a separate, pilot controlled device for controlling each of said variable modifying means, a freely deflectable member shiftable automatically in response to changes in density of the liquid in said vessel means having no direct structural operating connection to said member but automatically responsive to changes in the position of said member for controlling one of said pilot controlled devices, another freely deflectable member automatically responsive to changes in the liquid level in said chamber, means having no direct, structural operating connection to said another member but automatically responsive to changes in the position of that member for controlling the other of said pilot controlled devices, said member which is responsive to changes in liquid level serving to control the discharge of liquid from said modifying chamber, and said member which is responsive to changes in density of the liquid serving to control said first mentioned modifying means for varying the inflow of liquid into said modifying chamber.

7. In a continuous solution concentrating apparatus of the type having an evaporator, a dilute solution feed line leading to said evaporator, and a discharge line leaving said evaporator, the feed line being controlled by the density of the concentrated solution and the discharge line being controlled automatically by the liquid level, that improvement in the control of the feed line comprising means, including a sampling circuit, for continuously withdrawing concentrated solution from the evaporator and returning it to the evaporator, a closed passage, sample weighing device included in said circuit for continuously weighing the circulating solution, a valve controlling flow through said feed line, an air motor for varying the opening through said valve proportionally to changes in air pressure on said motor, and a pilot device controlled by said weighing device but having no direct structural operating connection thereto and causing an air pressure on said air motor proportioned to the density of the solution sample being weighed, whereby the density of said solution in said weighing device will control the feed of dilute solution to the evaporator.

8. In a continuous solution concentrating apparatus of the type having an evaporator, a dilute solution feed line leading to said evaporator, a discharge line leaving said evaporator, that improvement for use therewith comprising means, including a sampling circuit, for continuously withdrawing concentrated solution from the evaporator and returning it to the evaporator, a closed passage, sample weighing device included in said circuit for continuously weighing the circulating solution, a valve controlling flow through said feed line, an air motor for varying the opening through said valve proportionally to changes in air pressure on said motor, a pilot device controlled by said weighing device and causing an air pressure on said air motor proportioned to the density of the solution sample being weighed, whereby the density of said solution in said discharge line leaving said evaporator will be maintained approximately constant, and means responsive to variations in the liquid level in said evaporator for causing removal of the concentrated solution from said evaporator through said discharge line at a rate that increases proportionally to rises in the liquid level and in said evaporator and at a rate that decreases proportionally to a fall in the liquid level and thereby tends to maintain a constant level of solution in said evaporator.

9. In an evaporator for continuously concentrating a soltion of the type having a separator chamber and a heater connected in series, a pump having a connection at its intake side to the bottom of said chamber and at its delivery side to the intake side of said heater, and means automatically operative to maintain a uniform solution level in said chamber, that improvement for use therewith which comprises a dilute solution supply pipe connected directly to the intake side of said heater beyond said pump, and having a controlling valve in series therein, a delivery pipe leading from said connection from the delivery side of said pump before the connection to the solution supply pipe to deliver for use concentrated solution from said pump, a closed passage, adjustable, sample weighing device connected at one end to the delivery side of said pump and at its other end to the bottom of said chamber for continuously weighing the concentrated solution passing therethrough, a baffle linked to and freely movable by said weighing device in direct proportion to changes in density of the solution sample passing through the weighing device, a fluid operated circuit connected to and operating said valve to pass dilute solution to said heater at a rate which depends on the pressure in said fluid operated circuit, said fluid operated circuit having an escape passage controlled in the amount of escape of fluid therethrough by the position of said baffle in front of said escape passage determined by said weighing device, to control the fluid pressure on said valve and thereby the flow of dilute solution to the heater, said baffle controlling the escape of fluid to cause operation of said valve to increase the flow of fresh dilute solution therethrough directly proportional to increases in the density of said concentrated solution as determined by said weighing device and to cause operation of said valve to decrease the flow of fresh dilute solution therethrough directly proportional to decreases in the density of said concentrated solution as determined by said weighing device.

10. In an apparatus for continuously concentrating a solution, of the type having a concentrator, a dilute solution supply line connected to the concentrator, means for withdrawing concentrated solution from one part of the concentrator and returning it to another part of the concentrator, and an outlet conduit connected to said means for removing concentrated solution, that improvement for use therewith which comprises a fluid pressure operated valve in said supply line, fluid actuated means for varying the setting of said valve to control the rate of solution flow to said concentrator, proportionally to the fluid pressure of said fluid actuated means, the latter having an escape passage whose resistance controls the effective fluid actuating pressure on said valve, a baffle freely movable in front of said passage in directions to control the rate of fluid escape therefrom, a closed sampling passage for connection to different parts of said concentrator and through which concentrated solution may continuously pass, means for causing continued circulation of concentrated solution through said sampling passage, and means directly responsive to the density of the solution passing through said sampling passage for moving said baffle in a direction to regulate said escape passage and cause opening and closing movements of said valve by variations of the fluid pressure on said valve, said valve being opened to increase the flow of fresh dilute solution to said concentrator directly proportional to the increase in the density of the concentrated solution as determined by said sampling circuit, and to decrease the flow of fresh dilute solution to said concentrator directly proportional to the decrease in density of the concentrated solution as determined by said sampling circuit.

11. In an apparatus for continuously concentrating a solution, of the type having a concentrator, a dilute solution supply line connected to the concentrator, sampling means for withdrawing concentrated solution from one part of the concentrator and returning it to another part of the concentrator, means responsive automatically to the density of the concentrated solution moving through said sampling means for controlling the passage of dilute solution to the concentrator at a rate which maintains approximately uniform the concentration of solution in said concentrator, and an outlet conduit connected to said concentrator for removing concentrated solution therefrom, that improvement for use therewith which comprises a variable delivery pump device connected at its intake side to said outlet conduit, a pressure responsive device having a pair of pipes, one for connection to said concentrator above the solution level therein and the other for connection to said concentrator below the minimum expected solution level therein, whereby a liquid head corresponding to the difference in heads in said pipes will be applied to said pressure responsive device, and a pilot device responsive to variations in said head pressure on said pressure responsive device but having no direct structural operating connection thereto, for varying the delivery of said pump device, to increase and decrease it proportionally to deviations of said head pressures on said pressure responsive device, and maintain an approximately constant solution level in said concentrator.

12. In an apparatus for continuously concentrating a solution, of the type having a concentrator, a dilute solution supply line connected to the concentrator, sampling means for withdrawing concentrated solution from one part of the concentrator and returning it to another part of the concentrator, means responsive automatically to the density of the concentrated solution moving through said sampling means for controlling the passage of dilute solution to the concentrator at a rate which maintains approximately uniform the concentration of solution in said concentrator, and an outlet conduit connected to said concentrator for removing concentrated solution therefrom, that improvement for use therewith which comprises a variable delivery pump device connected at its intake side to said outlet conduit, a pressure responsive device having a pair of pipes, one for connection to said concentrator above the solution level therein and the other for connection to said concentrator below the minimum expected solution level therein, whereby a liquid head corresponding to the difference in heads in said pipes will be applied to said pressure responsive device, a liquid supply pipe connected separately to each of said pair of pipes, close to said pressure responsive device, and an individual valve in each connection from said supply pipe to each of said pair of pipes, whereby said valves may be opened to give a trickle flow of liquid through both pipes of said pair to keep them free of any concentrated solution.

13. In a continuous solution concentrating device of the type having an evaporator, a dilute solution feed line leading to the upper part of said evaporator, and means for removing concentrated solution from the lower part of said evaporator, that method of controlling the density of the concentrated solution being removed, which comprises continuously circulating some of the concentrated solution through a closed branch passage from one part of the evaporator back to the evaporator at another part thereof, continuously weighing a portion of the solution passing through said branch passage, automatically varying the rate of flow of dilute solution through said feed line proportionally to the deviations of density of solution being weighed from a predetermined normal density, and damping rapid changes in the rate of flow of dilute solution through said feed line.

14. In a continuous, liquid-concentrating evaporator, the combination of a heater, a vapor separator, conduits outside of said heater and separator and connecting said heater and separator in series with each other to form a closed circuit, a pump in said circuit between the separator and heater for circulating the liquid from the separator through said heater and said separator in succession, an inlet pipe connected to and opening into the conduit between said pump and said heater in the direction of liquid flow in said closed circuit for supplying fresh liquid to said circulating liquid, a power operated valve in said inlet pipe and responsive in its degree of opening proportionally to the power applied thereto, a source of power for said valve, means for continuously weighing a sample of said recirculating liquid before the introduction of fresh liquid thereto and returning it to said closed circuit, pilot means responsive to the density of said sample for controlling, through variations in the application of said source of power to said valve to move the valve in an opening direction upon an incerase in said density and to move the valve in a closing direction upon a decrease in said density, the flow of fresh liquid through said pipe to said heater to maintain approximately constant the average density of the liquid in said separator.

15. In a continuous, liquid-concentrating evaporator, the combination of an evaporator unit, a conduit outside of said unit, means for recirculating the liquid through said unit and said conduit in succession, an inlet pipe connected to and opening into said conduit between said recirculating means and said unit in the direction of liquid flow in said conduit, for supplying fresh liquid to said circulating liquid, an air pressure operated valve in said inlet pipe and responsive in its degree of opening to the air pressure applied thereto by moving in an opening direction as the air pressure thereon is increased and in a closing direction as the air pressure thereon is decreased, a source of compressed air, valve to operate it, means connecting said source of compressed air to said valve to operate it and including therein a variable means which controls the flow of compressed air from said source to said valve, means for regulating said variable means to pass increased air to said valve or to decrease it and including a pivoted member whose position controls the activity of said variable means, means for continuously weighing a sample of said recirculating liquid before the introduction of fresh liquid thereto and returning it to said unit, and means responsive to variations in the weight of said sample for moving said pivoted member to cause variation in the air pressure on said valve by progressively opening said valve with increases in the density of said weighed sample and closing it with decreases in the density of said weighed sample.

16. In a continuous, liquid-concentrating evaporator, the combination of an evaporator unit, a conduit outside of said unit, means for forcibly recirculating the liquid through said unit and said conduit in succession, an inlet pipe connected to and opening into said conduit between said recirculating means and said unit in the direction of liquid flow in said conduit, for supplying fresh liquid to said circulating liquid, an air pressure operated valve in said inlet pipe and responsive in its degree of opening proportionally to the amount of air pressure applied thereto, a source of compressed air connected to said valve for operating it to extents depending upon the pressure of the air applied to the valve means for varying the pressure of air from said source on said valve and having a freely moving pivoted controlling member the position of which determines the air pressure on said valve, means for continuously weighing a sample of said recirculating liquid before the introduction of fresh liquid thereto and returning it to said unit, means responsive to the density of the liquid of the weighed sample for varying the amount of air pressure delivered to said air pressure operated valve, and means operable by the pressure of the air delivered to said valve for altering the position of said controlling member to reduce the pressure of air delivered to the valve during surges of air so delivered.

17. In a continuous, liquid-concentrating evaporator, the combination of an evaporator unit, a conduit outside of said unit, means for recirculating the liquid through said unit and said conduit in succession, an inlet pipe connected to and opening into said conduit between said recirculating means and said unit in the direction of liquid flow in said conduit, for supplying fresh liquid to said circulating liquid, an air pressure operated valve in said inlet pipe and responsive in its degree of opening to the air pressure applied thereto, a source of compressed air connected to said valve for operating it to extents depending on the air pressure supplied thereto, means for continuously weighing a sample of said recirculating liquid, before the introduction of fresh liquid to said recirculating liquid and returning it to said unit, an auxiliary valve in the connection of said source of compressed air and said first valve and controlling the flow of compressed air to said first valve, means including a throttled air stream for controlling said auxiliary valve and having an escape orifice for said throttled stream, a baffle controlling, by its position in front of said orifice, the escape of air from said orifice, and means responsive to changes in the density of said sample for varying the position of said baffle in front of said orifice to variably throttle the escape of air from said orifice and by it cause an operation of said auxiliary air valve and through it an operation of said air pressure operated valve, said air pressure operated valve being opened progressively and proportionally to the air pressure applied thereto, with operation in an opening direction when an increase in density of said sample causes movement of said baffle in one direction, and in a closing direction when a decrease in the density of said sample causes movement of said baffle in the opposite direction.

18. In a continuous, liquid-concentrating evaporator, the combination of an evaporator unit, a conduit, means for forcibly recirculating the liquid through said unit and said conduit in succession, an inlet pipe connected to and opening into said conduit between said recirculating means and said unit in the direction of liquid flow in said conduit, for supplying fresh liquid to said circulating liquid, an air pressure operated valve in said inlet pipe and progressively and proportionally responsive in its degree of opening to the air pressure applied thereto, a source of compressed air connected to said valve for operating it, means for continuously weighing a sample of said recirculating liquid, before the introduction of fresh liquid to said recirculating liquid and returning it to said unit, an auxiliary valve in the connection of said source of compressed air and said first valve and controlling the flow of compressed air to said first valve, means including a throttled air stream for controlling said auxiliary valve and having an escape orifice for said throttled stream, a baffle controlling, by its position in front of said orifice, the escape of air from said orifice and thereby the operation of said auxiliary valve, means responsive to changes in the density of said sample for varying the position of said baffle in front of said orifice and through it varying the air pressure on said first valve, said air pressure operated valve being opened proportionally to any increase in the density of said sample, and closed proportionally to any decrease in the density of said sample and means responsive to the pressure of air on said first valve for additionally and temporarily altering the position of said baffle before said orifice to restrict the opening of said auxiliary valve when the air flow to said first valve is above a selected rate, whereby the rate of operation of said first valve will be restricted.

19. In a continuous, liquid-concentrating evaporator, the combination of an evaporator unit, a pipe connected to the bottom of said unit for removing condensed liquid therefrom, a motor, a pump in said pipe, a variable speed drive between said motor and pump, an air motor operating said variable speed drive to vary the rate of operation of said pump with changes in air pressure thereon, a source of air under pressure, a tube connected to said source having a throttle therein and terminating beyond said throttle in an orifice, a baffle mounted for movement toward and from said orifice to regulate the escape of air from said tube, means responsive to variations in the liquid level in said unit for shifting said baffle toward and from said orifice, and means responsive to the air pressure in said tube between said throttle and orifice for delivering air from said source to said air motor and thereby operating said variable speed drive to increase the speed of operation of said pump when the liquid level rises above a selected level and to decrease such speed of operation of said pump when the liquid level falls below said selected level.

20. In a continuous type, solution concentrating evaporator, the combination of an evaporating unit, a feed line connected to said unit for supplying thereto fresh solution to be concentrated, an air pressure operated valve in said feed line and having a degree of valve opening varying proportionally with the amount of air pressure applied to said valve, a regulator arranged to primarily vary the air pressure supplied to said valve and thus to vary the degree of opening of said valve, and including a movable controlling member, controller means operatively connected to said controlling member to temporarily modify the position of said member, said controller means being of the proportional reset type having a connection to said member, a continuous solution sample weighing means including an element freely movable in response to changes in density of said sample, means by which a sample of the concentrated solution from said unit is continuously passed through said weighing means, and means for transmitting the movements of said element to said member and through it varying the air pressure applied to said valve with variations in the density of the sample being weighed, said air pressure on said valve causing an opening of said valve proportionally to any increase in the density of said sample and a closing of said valve proportionally to any decrease in the density of said sample.

21. In a continuously operating liquid concentrating apparatus, the combination of a heater, a vapor separator, conduits outside of the heater and separator connecting the separator and heater in series to form a closed circuit through which a liquid to be concentrated passes in recirculation, an outlet pipe connected to said circuit, at the outlet side of said separator, for removing some of the concentrated liquid leaving said separator, an inlet pipe connected to said circuit prior to the ingoing side of said heater and after the connection of said outlet pipe to the circuit for delivering fresh liquid to be concentrated to the recirculating liquid passing through said heater, a valve in said inlet pipe, a sample weighing device having an inlet and an outlet for continuously weighing a liquid sample circulating therethrough, a connection from said inlet of the weighing device to said circuit between the outlet side of the separator and prior to the connection of the inlet pipe to said circuit for diverting some of the recirculating liquid through said weighing device, means for forcing said diverted liquid through said weighing device continuously, and means responsive to the operation of said weighing device for causing an opening and closing of said valve with increases and decreases respectively in the density of the sample being weighed.

22. In a continuous solution concentrating device, that method which comprises continuously recirculating a body of the liquid as a confined stream in a closed circuit, heating the liquid at one part of the circuit, removing vapors from the heated liquid in a later part of the circuit, removing some of the recirculating liquid from said stream immediately after said removal of vapors, adding fresh liquid to be concentrated to said stream after said removal of liquid and prior to the heating part of the circuit, continuously weighing a part of the liquid of said stream after removal of vapors and before introduction to the stream of fresh liquid, and regulating the inflow of fresh liquid directly proportionally to variations in the weight of the sample being weighed to keep constant the density of the liquid of the stream after removal of vapors and before introduction of fresh liquid.

23. In a continuous solution concentrating device, that method which comprises continuously recirculating a body of the liquid in a confined stream in a closed circuit, heating the liquid at one part of the circuit, removing vapors from the heated liquid in a later part of the circuit, removing some of the recirculating liquid from said stream immediately after said removal of vapors, adding fresh liquid to be concentrated to said stream after said removal of liquid and prior to the heating part of the circuit, continuously sampling as to density the concentrated liquid in said stream after removal of vapors and before addition of fresh liquid, regulating the inflow of fresh liquid directly proportionally to variations of the density of the continuous samples of concentrated liquid and damping the effect of rapid fluctuations in the density of said samples on the addition of fresh liquid to said stream.

24. In a continuous solution concentrating device of the type having an evaporator, means for delivering solution to be concentrated to said evaporator at one part thereof, and means for removing concentrated solution from another and remote part of the evaporator, that improvement therein for controlling the density of the removed concentrate which comprises means for regulating the rate of flow of the solution to be concentrated to the evaporator, means for regulating the rate of permanent removal of the concentrated solution from the evaporator, a constant volume, closed, upright vessel; sampling means for continuously removing concentrated solution from the evaporator, circulating it through said closed vessel and back to said evaporator, a weighing device for continuously weighing said closed vessel and its contents and having a part movable back and forth in response to variations in the weight of said vessel and its contents, a control instrument having a freely movable member operated by said part, power operated pilot means controlled by the position of said freely movable member for operating said rate regulating means for the solution to be concentrated, to cause admission of solution to be concentrated to said evaporator at a rate which will keep approximately uniform the density of liquid in said evaporator as represented by the solution in said vessel, another control instrument having a freely movable member, power operated pilot means controlled by the position of said last mentioned member for controlling the operation of said means for regulating the rate of permanent removal of concentrated solution, and means automatically responsive to variations in the liquid level in said evaporator for moving said second freely movable member in a manner to cause delivery of said concentrated liquid for permanent removal at a rate which will keep uniform the liquid level in said evaporator.

25. In a continuous solution concentrating device of the type having an evaporator, and means for delivering solution to be concentrated to the evaporator at one part thereof and means for permanently removing concentrated solution from another part thereof remote from said one part, that improvement therein for controlling the density of the permanently removed concentrated solution which comprises a separator chamber, recirculating means for removing solution from the lower part of the separator chamber, heating it, and returning it to the separator chamber at the lower portion thereof, a feed line having a valve therein connected to said recirculating means for admitting fresh solution to be concentrated to said solution being recirculated by said recirculating means before it is heated, a closed, upright, constant volume vessel; sampling means for removing solution from the bottom of said chamber, circulating it upwardly through said vessel and returning it to said chamber, a weighing device for continuously weighing said closed vessel and its contents and having a part movable in response to variations in the weight of said vessel and its contents, a freely movable member, connections between said freely movable member and said part, sensitive pilot means controlled by the position of said member, a power operated device controlled by said pilot means for operating said valve to cause admission of solution to be concentrated to said evaporator at a rate which will keep approximately uniform the density of liquid in said chamber as represented by the solution in said vessel, another freely movable member, means automatically responsive to variations in the liquid level in said chamber for moving said another freely movable member, a pilot device controlled by the position of said another freely movable member, power operated means controlled by said last mentioned pilot device for permanently removing concentrated solution from the bottom of said chamber before fresh solution to be concentrated is added thereto, at a rate which will keep uniform the liquid level in said evaporator.

26. In a continuous solution concentrating device of the type having an evaporator through which solution passes as it is concentrated, that improvement therein for controlling the density of the permanently removed, concentrated solution, which comprises means for permanently removing solution from said evaporator at that part thereof where concentration of the solution is greatest, means for admitting solution to be concentrated to said evaporator at a part remote from that part where concentrated solution is permanently removed and where it does not directly dilute the solution being permanently removed, an upright, closed, constant volume vessel; sampling means for passing concentrated solution from that part of the evaporator where approximately maximum concentration of solution is contained through said vessel and back to said evaporator, a weighing device for continuously weighing said vessel and its contents and having an element movable in accordance with variations in the weight of said vessel and its contents, a freely movable member linked to said element for operation thereby, sensitive pilot means having no direct structural operating connection to said member but automatically responsive to variations in the positions of said member, power operated means controlled by said pilot means for regulating the action of said admitting means to admit solution to be concentrated to said evaporator at a rate which will keep approximately uniform the density of liquid in said evaporator as represented by that circulated through said vessel, another freely movable member, means automatically responsive to the variations in the liquid level in said evaporator for moving said other member in accordance with variations in said liquid level, further sensitive pilot means having no direct operating structural connection to said other member but responsive to changes in the position of said another member, and power operated means controlled by said further pilot means for controlling the operation of said means for permanently removing concentrated solution at a rate which will keep approximately uniform the liquid level in said evaporator.

27. In a continuous solution concentrating device of the type having an evaporator through which solution is passed and concentrated, that improvement therein for controlling the density of the permanently removed concentrated solution, which comprises means for permanently removing solution from that part of said evaporator where the concentration is a maximum, means for admitting solution to be concentrated to that part of said evaporator remote from said first part and where it will have a minimum effect on the concentration of liquid being permanently removed, an upright, closed, constant volume vessel, sampling means for passing concentrated solution from that part of said evaporator where there is maximum concentration of solution through said vessel, means for continuously weighing said vessel and its contents, a member operated by said weighing means and moving automatically in accordance with variations in the weight of said vessel and its contents, means having no direct structural operating connection with said member but controlled thereby for regulating the operation of said means for admitting to the evaporator the solution to be concentrated at a rate which will keep approximately uniform the density of liquid in said evaporator as represented by that circulated through said vessel, means automatically responsive to variations in the liquid level in said evaporator, and having a member movable in accordance with said variations, and means having no direct structural operating connection from said last mentioned member but controlled thereby for regulating the operation of said means for permanently removing concentrated solution from said evaporator at a rate which will keep approximately uniform the liquid level in said evaporator.

28. The method of continuously concentrating a liquid, which comprises continuously recirculating the liquid to be controlled in a closed, endless defined circuit as a confined endless stream, heating the liquid in a downflow stream in one part of said circuit, removing vapors from the heated liquid in another separate and later part of said circuit, admitting fresh liquid to be concentrated to said stream after said removal of vapors and before said heating, permanently removing some of said liquid from said stream after the removal of vapors therefrom and before said fresh liquid is admitted to said stream, continuously sampling, as to density, the liquid in said stream after the removal of vapors and prior to the said introduction of fresh liquid to the stream, and regulating the rate of admission of said fresh liquid directly proportionally to the variations in the density of said sampled liquid.

29. In a continuous, liquid-concentrating evaporator, the combination of a downflow, film-type heater, a separator having a chamber extending below the lower end of said heater, a connection from the lower part of said heater to said separator above the lower end thereof and opening into said chamber, a conduit connecting the lower end of said separator to the upper end of said heater, a circulator element in said conduit for drawing unvaporized liquid from said separator chamber and delivering it into the top of said heater, an inlet pipe connected to said conduit for admitting thereto fresh liquid to be concentrated, an outlet pipe connected to said conduit between said separator and the connection of said inlet pipe to said conduit for removing liquid leaving said separator before it is diluted by fresh liquid, a branch pipe connected to said outlet pipe and connected back to said separator, a closed volume vessel in series in said branch pipe upwardly through which the returned liquid passes to said separator, means for continuously weighing said vessel and its contents, and means controlled by said weighing means for regulating the flow of liquid through said inlet pipe in an amount directly proportionally to the variations in the weight of said contents of said vessel.

30. In a continuous liquid-concentrating evaporator, the combination of a downflow, film type heater having upper and lower heads connected by tubes, and a heating jacket around the tubes, a separator having a separating chamber, a connection from the lower head of said heater to said separator and opening into said chamber above its bottom, means for removing vapor from the upper part of said chamber, a conduit connecting said separator at the bottom of said chamber to the upper head of said heater, a circulator in said conduit for causing a forced circulation of unvaporized liquid from the bottom of said chamber into said upper head, said heater, separator, conduit and circulator forming a closed circuit for liquid being concentrated, means for removing some of the circulating liquid from said circuit, means for returning part of said removed liquid to said circuit including a closed volume vessel, upwardly through which the returned liquid part passes, means for regulating the flow of the balance of said removed liquid which is permanently removed, means for introducing fresh liquid to be concentrated into said circuit at a place between said upper head and said liquid removal means, whereby the introduced fresh liquid will pass first through said heater means for continuously weighing said vessel and its contents, means controlled by said weighing means for controlling said fresh liquid introducing means to pass an amount of fresh liquid which is directly proportional to the weight of said contents of said vessel, and sufficient to maintain approximately constant the density of the permanently removed liquid.

References Cited in the file of this patent

UNITED STATES PATENTS

| | | |
|---|---|---|
| 378,843 | Lillie | Feb. 28, 1888 |
| 559,857 | Lillie | May 12, 1896 |
| 1,575,643 | Salich | Mar. 12, 1896 |
| 2,040,357 | Chalatow | May 12, 1936 |
| 2,063,166 | Jansse | Dec. 8, 1936 |
| 2,073,825 | Beck et al. | Mar. 16, 1937 |
| 2,089,711 | Reeves | Aug. 10, 1937 |
| 2,140,942 | Reeves et al. | Dec. 20, 1938 |
| 2,298,112 | Edwards et al. | Oct. 6, 1942 |
| 2,361,885 | Tate et al. | Oct. 31, 1944 |
| 2,570,211 | Cross | Sept. 9, 1946 |